United States Patent Office
3,848,005
Patented Nov. 12, 1974

3,848,005
INHIBITION OF IRON-CATALYZED DEHYDRO-
CHLORINATION OF ALKYL CHLORIDES
Henry W. Sullivan, Houston, Tex., assignor to
Shell Oil Company
No Drawing. Filed Nov. 15, 1972, Ser. No. 306,964
Int. Cl. C07c 17/40, 17/42
U.S. Cl. 260—652.5 R    2 Claims

ABSTRACT OF THE DISCLOSURE

Ferric ion-catalyzed dehydrochlorination of alkyl chlorides of 3 to 20 carbon atoms is inhibited by the addition of a lower alkanol solution of a partial amide of ethylene diamine tetraacetic acid to the ferric ion-containing alkyl chloride in a molar quantity which is at least equal to the moles of ferric ion present, said partial amide being formed by the reaction of one mole of ethylene diamine tetraacetic acid with at least two moles of a lower alkylamine in a lower alkanol solvent.

BACKGOUND OF THE INVENTION

The present invention relates to an improved process for inhibiting the iron-catalyzed dehydrochlorination which occurs in alkyl chloride fractions contaminated with small quantities of ferric ion-containing materials. More particularly, this invention relates to a process for inhibiting iron-catalyzed dehydrochlorination which occurs with lower and intermediate molecular weight alkyl chlorides, e.g., up to $C_{20}$, contaminated with small quantities of ferric ion-containing materials when such ferric ion contaminated alkyl chlorides are maintained at the elevated temperatures which occur in distillation or other processing operations. Many conventional chemical manufacturing processes in which alkyl chlorides are essential intermediates or the desired final product require than an alkyl chloride-containing process stream be heated at elevated temperatures for processing operations such as purification and/or subsequent reaction of the alkyl chloride at elevated temperature with other reactants to obtain intermediates or products desired. One such example of an alkyl chloride-contain process stream being subject to residence times at elevated temperatures occurs in the conventional process for chlorination of normal paraffins and subsequent dehydrochlorination to give olefins in the $C_6$ to $C_{20}$ range. The olefin products of this process are especially useful as precursors for detergent range alcohols, i.e., $C_{12-20}$, and plasticizer range alcohols, i.e., $C_{6-12}$, both derived from catalytic hydroformylation of the olefins. In this chlorination/dehydrochlorination process normal paraffins are chlorinated with molecular chlorine, usually with high molar ratios of paraffins to chlorine, to yield a statistical mixture of mono-, di- and polysubstituted alkyl chlorides. The alkyl chloride product mixture is heated to elevated temperatures sufficient to distill the unreacted paraffin overhead for recycle into the chlorination step and the crude alkyl chloride bottoms product of the distillation is subject to intentional catalytic dehydrochlorination using conventional catalysts to yield, on subsequent purification, the desired olefin product. In this process, it is essential to the optimization of yields (lbs. paraffin/lbs. olefin) and ease of operation that any dehydrochlorination of the alkyl chloride product mixture (thermal or catalytic) be minimized or eliminated in the phase of the process in which unreacted paraffin is distilled overhead from the alkyl chloride reaction product. The olefin product of any dehydrochlorination occuring in this paraffin distillation step will be overheaded with the unreacted paraffin and recycled to the chlorination reaction where it will be rechlorinated to poly chlorinated products. These polychlorinated products are ultimately rejected as heavy ends in the process and the overall process yield of olefin based on paraffin charged is thereby reduced. Also, if the extent of dehydrochlorination occurring in the paraffin distillation step is sufficiently severe the quantity of hydrogen chloride and olefin distilled overhead with the paraffin may tax the overhead vacuum and condensing equipment and increase the time and heat requirements of the distillation, thereby reducing the ease of operation of the process, as well as limiting unit capacity. In addition, the undesirable polychlorinated products are coke precursors that result in limited performance as coke builds up in the equipment. While at the temperatures required for distillation of paraffins in the detergent range, i.e., about 200 to 250° C., the extent of thermal dehydrochlorination is insignificant, small quantities of iron present as ferric ion in the alkyl chloride-containing process steam—i.e., present in amounts as low as 1 part per million (p.p.m.) ferric ion in the process stream—will catalyze dehydrochlorination of the alkyl chlorides present to a sufficient degree that significant reductions in the yield of olefins from paraffins changed are incurred. Even at temperatures in the range of about 100° to 200° C., the temperature range required for distillation of paraffins in the plasticizer range, ferric ion-catalyzed dehydrochlorination of the alkyl chlorides present occurs at a sufficient degree to cause noticeable yield reductions in the overall process, though to a lesser degree than observed for the detergent range paraffins.

While iron contamination of the paraffin feedstocks for the chlorination/dehydrochlorination process is not ruled out, it appears that the primary source of ferric ion in this process stream is the processing equipment since iron alloy reactors, piping, stripping columns, etc., are conventionally used in manufacturing facilities of the size required to economically produce olefins by this method. Of course, the problem of ferric ion catalyzed dehydrochlorination of the alkyl chlorides in this system could be minimized or eliminated by the use of special processing equipment such as glass-lined vessels, etc., however, the cost of such equipment on the scale required for economical operation would be prohibitive. A more desirable alternative appears to be chemical treatment of the process stream prior to paraffin distillation to remove or deactivate the ferric ion present therein.

DESCRIPTION OF THE PRIOR ART

It is well known that transition metal ions including the ferric ion will form complexes with a number of conventional organic complexing agents and that this complex formation can be an effective means of reducing the concentration of free metal ions in solution in any given system if the complex formed is "inert"—i.e., the complex is stable (does not dissociate)—during its residence in the system. It is also well known that ferric ion forms its strongest (most stable) complexes with anionic ligands such as carboxylate ions and anions of hydroxyanthraquinones, e.g., see D. D. Perrins, *Organic Complexing Reagents*, 286–7 (1964). However, attempts to inhibit ferric ion catalyzed dehydrochlorination of alkyl chlorides in the lower and intermediate molecular range, e.g., up to $C_{20}$, at elevated temperature by complexing the ferric ions with an anionic carboxylate ligand such as ethylene diamine tetraacetic acid (EDTA), were largely unsuccessful apparently due to the insolubility of the reagent in the system. Also, similar attempts with alizarin (1,2-dihydroxyanthraquinone) were unsuccessful possibly due to the instability of the complex in the system. Other materials evaluated and found to be ineffective include catechol, p-xylene, 2,2'-dipyridine and 8-hydroxyquinoline. The most effective of the conventional materials evaluated is Questamid E–20 (Stauffer Chemical Co.), an oil soluble EDTA derivative which purportedly contains between one and three amide groups per molecule together with free acid groups. However, this material has a tacky gum-like consistency making it extremely hard to handle on a plant scale and appears to be only marginally soluble in liquids which are substantially alkyl chlorides of up to 20 carbon atoms or mixtures thereof. Additionally, utilization of this material on a plant scale in a conventional paraffin chlorination/dehydrochlorination process as discussed above by metering into the alkyl chloride-containing process stream prior to paraffin distillation did not measurably increase the yield of paraffin to olefin in the overall process. Quadrol (Wyandotte Chemical Corp.) N,N,N'N'-tetrakis - (2 - hydroxypropyl)ethylenediamine, possess dehydrochlorination inhibiting activity on the same approximate level as that observed for Questamid E–20, in other words, activity which is unacceptable for plant scale processes. Therefore, it would be advantageous if a complexing reagent were available which would form "inert" ferric ion complexes in the presence of alkyl chlorides at elevated temperatures and which is sufficiently soluble in mixtures which are substantially alkyl chlorides of up to 20 carbon atoms and easy to handle that it can be effectively utilized on a plant scale to inhibit ferric ion catalyzed dihydrochlorination of the alkyl chlorides as hereinbefore described.

SUMMARY OF THE INVENTION

It has now been found that the dehydrochlorination of alkyl chlorides containing 3 to 20 carbon atoms per molecule, when catalyzed by the presence of small quantities of ferric ion, is inhibited by the addition of a lower alkanol solution of a partial amide of ethylene diamine tetraacetic acid to the ferric ion-containing alkyl chloride in a molar quantity which is at least equal to the moles of ferric ion present, said partial amide being formed by the reaction of one mole of ethylene diamine tetraacetic acid with at least two moles of a lower alkyl amine in a lower alkanol solvent.

Lower alkanol solutions of partial amides of ethylene diamine tetraacetic acid prepared according to the process of the invention exhibit sufficient solubility in alkyl chlorides of 3 to 20 carbon atoms, or mixtures thereof, that quantities of the partial amide adequate to complex all or substantially all of ferric ion impurity which reasonably could be present in the alkyl chloride due to feedstock contamination and/or corrosion of iron containing equipment, e.g., 100 p.p.m, of partial amide, are readily dissolved in the alkyl chloride containing stream by simple metering into a continuous system. Moreover, the partial amide prepared according to the invention combines with free ferric ions present in liquid media containing substantial amounts of alkyl chlorides of 3 to 20 carbon atoms to form complexes which are "inert," i.e., do not dissociate, thus inhibiting ferric ion-catalyzed dehydrochlorination, even when the alkyl chloride containing the complexed ferric ions is heated at temperatures in the range of 200–250° C. for extended periods of time, e.g., one hour. Finally, the lower alkanol solutions of the partial amides prepared according to the invention are quite fluid at ambient temperatures and easy to handle on plant scale operations.

The process of the invention is especially attractive when applied to inhibit ferric ion-catalyzed dehydrochlorination of alkyl chloride occurring during the paraffin distillation operation in the production of olefins according to the conventional paraffin chlorination-dehydrochlorination process hereinbefore described. In this process the practice of the invention sufficiently inhibits ferric ion catalyzed dehydrochlorination even at temperatures and residence times required to distill unreacted paraffins in the detergent range, e.g., $C_{12}$–$C_{20}$ that yields of olefin based on paraffin charged are afforded which are unobtainable with conventional complexing agents. The practice of the invention to inhibit dehydrochlorination in the paraffin distillation step in the production of olefins by the paraffin chlorination/dehydrochlorination process hereinbefore described forms a preferred aspect of this invention.

DESCRIPTION OF THE PREFERRED EMBODIMENTS

Alkyl Chloride Feedstock. The process of the invention effectively inhibits ferric ion-catalyzed dehydrochlorination of alkyl chlorides occurring in liquid media contaminated with small quantities of ferric ion wherein the liquid media comprises alkyl chlorides of 3 to 20 carbon atoms or mixtures thereof or liquid media made up substantially of alkyl chlorides of 3 to 20 carbon atoms or mixtures thereof; the remainder of the liquid made up substantially of non-polar hydrocarbons. Alkyl chlorides for which ferric ion dehydrochlorination is effectively inhibited by the process of the instant invention include mono-substituted alkyl chlorides, alkyl dichlorides and alkyl polychlorides with the proviso that at least one carbon atom of the alkyl moiety adjacent to a chlorine substituted carbon atom be substituted by at least one hydrogen atom. The alkyl moieties can be of straight-chain or branched-chain structure. Examples of alkyl chlorides suitable for use in the invention include 1,3-dichloropropane, 1,1,1-trichloropropane, 1-chloro-2-methylbutane, 2,7-dichlorooctane, 1-chlorohexane, 5 - chlorodecane, 3,6 - dichloroheptane, 3,6,9 - trichlorodecane, 4 - chlorotetradecane, 1,4-dichlorododecane, 6,11,14 - trichlorohexadecane and 1,12-dichloroecosane. Preferred feedstocks because of their abundance in commerce are the monosubstituted alkyl chlorides. Most preferred are the mono-substituted alkyl chlorides wherein the alkyl moiety contains from 6 to 20 carbon atoms. Exemplary species of this preferred class include 1-chlorohexane, 2-chloroheptane, 1-chlorooctane, 3-chlorononane, 1-chlorodecane, 4 - chloroundecane, 2-chlorododecane, 1-chlorotridecane, 1-chlorotetradecane, 3-chloropentadecane, 5-chlorohexadecane, 1 - chloroheptadecane, 2 - chlorooctadecane, 6-chloronondecane and 1-chloroeicosane.

As indicated above, the alkyl chloride feedstock may contain, in addition to the alkyl chloride or mixtures of alkyl chlorides, other non-polar hydrocarbons. These non-polar hydrocarbons may be aliphatic (both saturated and unsaturated) or aromatic in character and may be substituted with functional groups, e.g., chlorine, bromine, nitro and the like, which are unreactive with the ferric ion complex formed according to the process of the invention. As indicated above, a preferred aspect of the invention is the inhibition of ferric ion-catalyzed dehydrochlorination occurring in the paraffin distillation step of the process for manufacture of olefins by chlorination of paraffins with molecular chlorine to yield a mixture of alkyl chlorides which is predominantly monosubstituted alkyl chloride followed by catalytic dehydrochlorination of the alkyl chlorides to give oefins in the $C_6$–$C_{20}$ range; the paraffin distillation step occuring in the process scheme subsequent to the chlorination step thereby affording a means of recovering unreacted paraffins for recycle to the chlorination reaction. In this preferred aspect it is contemplated that the alkyl chloride feedstock will contain, in addition to alkyl monochlorides and smaller amounts of alkyl di- and polychlorides, significant amounts of paraffinic hydrocarbons, i.e., straight-chain and branched chain saturated aliphatic hydrocarbons as well as minor amounts of aromatic hydrocarbons which are conventionally present as contaminants in the paraffin feedstocks to the process.

The process of the invention is effective in inhibiting dehydrochlorination of alkyl chlorides catalyzed by small quantities of ferric ion present in the alkyl chloride stream. The maximum limits on the concentration of ferric ion in the alkyl chloride feedstock which can be effectively complexed according to the invention has not been definitely established, because certain practical and economic limitations on the practice of the invention make determination of such ultimate limits unnecessary. Thus, factors such as the quantity of ferric ion contaminant conventionally present in alkyl chlorides derived from commercial sources, or the ferric ion contaminant present in conventional materials utilized as starting materials in the manufacture of alkyl chlorides, the quantity of ferric ion which will be picked up from iron and iron alloy processing equipment by an alkyl chloride containing process stream during its residence in the system and the cost of complexing agent to deactivate large quantities of ferric ion in the process stream establish about 100 p.p.m. ferric ion in the alkyl chloride containing liquid as a practical upper limit on ferric ion concentration for the practice of this invention. Ferric ion concentrations as low as 1 p.p.m. in alkyl chloride containing liquid media can catalyze significant dehydrochlorination of the alkyl chlorides present under appropriate temperatures and residence times. Thus, concentrations of ferric ion in the alkyl chloride containing liquid media as low as 1 p.p.m., calculated as ferric ion, are within the limits of this invention. For the practice of this invention in its preferred aspect—i.e., inhibition of dehydrochlorination during the paraffin distillation step of the paraffin chlorination/dehydrochlorination process, discussed above—ferric ion concentrations of 1 to 50 p.p.m. in the alkyl chloride containing process stream appear to be practical limits and are preferred for that reason.

Partial Amide Complexing Agent. The precise chemical structure of the partial amide derivative of ethylene diamine tetraacetic acid (EDTA) is not known with certainty and is best described in terms of its method of production. In basic terms the complexing agent which is essential to the practice of this invention is the product of the reaction between a lower alkyl amine and EDTA in a lower alkanol solvent, the amine/EDTA molar charge ratio to the reaction being at least 2.

The lower alkyl amines which may suitably be used to prepare the partial amide complexing agents of this invention can be described by the structural formula I:

(I)

wherein $R^1$ represents methyl, ethyl, propyl, isopropyl or butyl and $R^2$ is hydrogen or $R^1$. Illustrative of the alkyl amines of formula (I) are dimethyl amine, ethyl amine, propylamine, methyl butyl amine, diethyl amine, and butylamine. In most applications, the particularly preferred class of alkyl amine are those wherein $R^1$ is methyl or ethyl and $R^2$ is hydrogen, e.g., methyl amine and ethyl amine.

The lower alkanol solvents which are essential to the preparation of the partial amide complexing agents of this invention can be described by the structural formula (II):

wherein R is methyl, ethyl, propyl or isopropyl. Illustrative of the lower alkanols of formula II are methanol, ethanol, propanol and isopropanol. Of the lower alkanols which are suitable as reaction solvents in the preparation of the partial amide complexing agents of this invention, the most preferred is methanol. While the function of the lower alkanol solvent is not known for certain, it is believed that it functions as a catalyst in the amidation reaction, reacting first with the carboxylic acid groups of the EDTA to form ester functions which in turn react faster and more readily with the amine reactant than do the parent acid moieties to form the amide end product.

The precise method in which the reaction, forming the partial amide derivative of EDTA of this invention, as carried out, is wholly conventional, in other words, the EDTA may be added neat to a lower alkanol solution of the lower alkyl amine or the lower alkyl amine may be added neat to the EDTA in lower alkanol solvent or both reactants may be mixed with lower alkanol solvent prior to reaction. The reaction is suitably conducted at reaction temperatures of about 50 C. to about 200° C., it being most convenient to carry the reaction out in refluxing alkanol solvent. The reaction temperature is somewhat dependent on the quantity of alcohol present in the reaction mass, in that conversion is affected at lower temperatures when higher concentrations of alcohol are employed. While the precise quantity of lower alkanol solvent utilized is not critical, in most cases best results are achieved at solvent concentrations of about 40% w. to about 80% w. based on the weight of reactants charged. The molar charge ratio of lower alkyl amine to EDTA in the reaction does appear to be critical in that it is necessary that a minimum of 2 moles of lower alkyl amine be reacted with each mole of EDTA present to form the uniquely effective partial amide complexing agent of this invention. From this it can be surmised that on the average at least two of the four carboxylic acid moieties of the EDTA molecule must be converted to amide functions to obtain the complexing activity in alkyl chloride media which is characteristic of this invention.

It is also essential to the practice of this invention that the partial amide reaction product of EDTA, described above, be dissolved in a lower alkanol solvent when it is added to the ferric ion-contaminated alkyl chloride feedstock. The class of lower alkanols which are suitable as solvents for the partial amide complexing agent is identical to the class of lower alkanols described as reaction solvents above. Thus, it is quite convenient to utilize the reaction product directly without going through the steps of solvent removal and addition of another solvent, although adjustments in solvent concentration are contemplated, depending on the quantity of reaction solvent used, and complete solvent changes are not precluded. While the exact quantity of lower alkanol solvent in the partial amide reaction product is not critical at solvent concentrations lower than about 25% w. based on the total weight of reaction product and solvent, the reaction product loses its fluid character and becomes increasingly difficult to handle on a plant scale. Unnecessary alkanol content can impose a burden on the ability of the process to reject "light ends." Cost and operating convenience therefore impose an upper limit on the desirable alkanol content. Thus, solvent concentrations of about 25% w. to about 70% w. based on total weight of complexing agent and solvent describe practical limits on solvent concentration for use in large scale manufacturing operations. Preferred solvent concentrations range from about 40% w. to about 50% w., based on total weight of complexing agent and solvent.

Ferric Iion Complex and its Formation. The formation of the "inert" ferric ion—partial amide of EDTA complexes of this invention can be accomplished by contacting the ferric ion contaminated alkyl chloride feedstock with the lower alkanol solution of the partial amide of EDTA in any conventional manner. Thus, the lower alkanol solution of the partial amide can be mixed with the alkyl chloride containing feedstock by adding the partial amide batchwise to a vessel containing the alkyl chloride feedstock or a stream of the lower alkanol solution of the partial amide can simply be metered into a flowing stream of the alkyl chloride-containing feedstock, when continuous processes are involved. Complex formation appears to take place instantaneously, however, sufficient mixing must be available to allow the complexing agent to disperse and contact all or substantially all of the ferric ion present in the alkyl chloride containing feedstock if optimum inhibition of ferric ion catalyzed dehydrochlorination is to be obtained.

Since minute quantities of ferric ion present in the alkyl chloride containing feedstock—i.e., amounts as low as 1 p.p.m. in the total feedstock—will catalyze significant dehydrochlorination of the alkyl chlorides under the appropriate conditions of temperature and residence, it is essential to the practice of this invention that sufficient partial amide complexing agent be added to complex all or substantially all of the ferric ion present in the alkyl chloride containing feedstock. The stoichiometry of the complex formation appears to be equimolar—i.e., one mole of the partial amide of EDTA being required to complex one mole of ferric ion—thus, to achieve the result contemplated by this invention it is necessary that at least one mole of partial amide complexing agent be added to the alkyl chloride containing feedstock for every mole of ferric ion which is present in the feedstock.

The temperature at which the "inert" ferric ion-partial amide of EDTA complex is formed according to this invention, or maintained after its formation is not critical, at least up to about 250° C., since the process of the invention will inhibit ferric ion catalyzed dehydrochlorination of alkyl chlorides to the extent which such dehydrochlorination might occur, even at ambient temperatures. However, since ferric ion catalyzed dehydrochlorination of alkyl chlorides becomes especially significant at elevated temperatures, i.e., about 200° C., a preferred application of the process of the invention is its utility in inhibiting ferric ion-catalyzed dehydrochlorination of alkyl chlorides wherein the ferric ion-contaminated alkyl chloride is to be maintained at temperatures ranging from about 100° to about 250° C. during, or subsequent to, the addition of the partial amide complexing agent according to this invention. At higher residence temperatures, the stability of the "inert" complex formed by the process of the invention appears to drop off somewhat, however, even at temperatures in the range of about 200° to about 250° C., the complex is known to be stable for periods of time in the range of one hour. Thus, the complex stability at these high temperatures is sufficient that it will remain "inert" during most conventional processing operations such as distillation, etc.

As indicated above, the process of the invention, because of the improved inhibition of ferric ion-catalyzed dehydrochlorination of alkyl chlorides which is obtained at elevated temperatures, is especially attractive—when applied to inhibit ferric ion-catalyzed dehydrochlorination of alkyl chlorides which occurs in the paraffin distillation step of the conventional process for production of olefins in the $C_6$ to $C_{20}$ range by chlorination of normal paraffins and subsequent catalytic dehydrochlorination to yield the desired olefinic product. The paraffin distillation step occurs in this process subsequent to the chlorination step, the object being to distill unreacted paraffins away from the alkyl chloride containing stream for recycle back into the chlorination reactor. The alkyl chloride containing chlorination reaction product charged to the paraffin distillation step conventionally contains 1 to 50 p.p.m. of ferric ion containing 65 to 85% w. unreacted paraffins and 2 to 6% w. combined alkyl di- and polychlorides in addition to the desired alkyl monochlorides. If the ferric ion present in the chlorination reaction product is not removed or deactivated in terms of its ability to catalyze dehydrochlorination then significant dehydrochlorination will occur at the elevated temperatures at which the unreacted paraffins are distilled off from the alkyl chlorides and the olefin products of the dehydrochlorination will be distilled over with the unreacted paraffins. Since, conventionally, the unreacted paraffin distillation product is recycled to the chlorination reaction, the olefins present in the paraffin distillation product will also be recycled to the chlorination reaction, unless expensive and time consuming paraffin-olefin separation processes are used, and a reduction in yield of olefins from paraffins charged will ensue since the olefins are converted to a polychlorinated products in the chlorination step which are ultimately rejected as heavy ends in the process or a reaction to form unwanted coke. This catalytic dehydrochlorination of alkyl chlorides occurring in the paraffin distillation step is especially severe in the case of distillation of the higher paraffin cuts, i.e., $C_{12}$ to $C_{20}$ normal paraffins, because of the temperatures required to effectuate the distillation, i.e., about 200 to about 250° C. It has been found that application of the process of the instant invention to inhibit dehydrochlorination in the paraffin distillation step of the paraffin chlorination/dehydrochlorination process described above so reduces the olefins made in the paraffin distillation step that heretofore unobtainable yields of olefin from paraffin charged are afforded. This preferred aspect of the invention can be described as an improved process for production of olefins containing 6 to 20 carbon atoms by chlorinating normal paraffins containing 6 to 20 carbon atoms with molecular chlorine in a first reaction zone to a reaction product which is essentially alkyl monochloride-containing small quantities of ferric ion, separating the unreacted paraffins from the reaction product of the first reaction zone by distillation at elevated temperatures in a paraffin distillation zone and recycling the unreacted paraffins so distilled to the first reaction zone, dehydrochlorinating the alkyl chloride-containing bottoms product of the paraffin distillation zone with a dehydrochlorination catalyst in a second reaction zone to yield a product which is substantially olefins of 6 to 20 carbon atoms; the improvement which comprises adding to the reaction product of the first reaction zone a lower alkanol solution of a partial amide of ethylene diamine tetraacetic acid in a molar quantity which is at least equal to the moles of ferric ion present, said partial amide being formed by the reaction of one mole of ethylene diamine tetraacetic acid with at least two moles of a lower alkyl amine in a lower alkanol solvent.

The illustrative embodiment of the process of the invention given directly below describes the application of the process of the invention to improve yields of olefin from paraffin charged by inhibition of ferric ion dehydrochlorination in the paraffin distillation step of the paraffin chlorination/dehydrochlorination process described above.

Illustrative Embodiment I

A. Preparation of the partial amide derivative of EDTA

Methyl amine was added over a 3 hour period to a reaction vessel containing ethylene diamine tetraacetic acid (EDTA) in refluxing methanol solvent. The methanol solvent concentration on completion of the addition was 60% w. based on the total weight of reaction product and solvent and the mole ratio of methyl amine to EDTA charged to the reaction was about 2. Upon completion of the addition, the reaction mixture was allowed to reflux for an additional 2 hour period at which time it was cooled to ambient temperatures. The crude reaction product containing 60% w. methanol was used directly to inhibit ferric ion catalyzed dehydrochlorination of alkyl chlorides in a plant scale operation.

B. Inhibition of dehydrochlorination

For the plant test, the partial amide derivative of EDTA in 60% w. methanol, prepared as above, was metered directly into the paraffin distillation column used to overhead unreacted paraffins from the alkyl chloride containing reaction product of the chlorination reaction in the process for production of olefins by chlorination/dehydrochlorination of normal paraffins. The paraffin distillation column is positioned in the process flow scheme immediately after the chlorination unit wherein normal paraffins in the $C_{11}$ to $C_{14}$ range are reacted with molecular chlorine at a paraffin to chlorine mole ratio of between 3 and 5 to 1. The plant test was conducted by metering the partial amide of EDTA in methanol solvent over a 10 day period into the paraffin distillation column during the $C_{14}$ carbon number paraffin distillation run. The average operating conditions for the paraffin distillation column during this test period were as follows: column bottoms temperature 220° C., column tops temperature 110° C., column bottoms pressure 103 mm. Hg, column tops pressure 17 mm. Hg. The average composition of the product from the distillation column during this run was 70% w. alkyl monochlorides, 25% w. alkyl di- and polychlorides, 4% w. paraffins and 20 p.p.m. of ferric ion. The partial amide derivative of EDTA in methanol solvent was metered into the distillation column at a rate sufficient to maintain the concentration of complexing agent at 100 p.p.m. in the alkyl chloride containing bottoms product during its residence in the column. The bottoms from the distillation were continuously withdrawn and charged to the dehydrochlorination step for catalytic conversion to olefins while the overhead from the column was recycled back into the chlorination step. The results of the test described in terms of overall process yield of olefin from paraffin charged and the average olefin concentration in the overhead of the paraffin distillation column during the test run are given in Table I below. Also recorded in Table I are the results of a control run wherein no complexing agent is added to the feed in the paraffin distillation column and a plant test conducted under similar conditions and operating procedures but with Questamid E-20 (Stauffer Chemical Co.) as the complexing agent.

TABLE I

| Complexing Agent | Paraffin/olefin yield (lbs.) | Avg. olefin conc. in paraffin distillation columns overhead, percent w. |
|---|---|---|
| Control | 1.30 | 2.4 |
| Questamid E-20 | 1.31 | |
| Partial amide derivative of EDTA in 60% w. methanol | 1.20 | 2.2 |

I claim as my invention:

1. A stabilized composition to inhibit the dehydrochlorination of alkyl chlorides of 3 to 20 carbon atoms at a temperature ranging from about 100° C. to about 250° C., catalyzed by the presence of small quantities of ferric ion, consisting essentially of alkyl chlorides of 3 to 20 carbon atoms, ferric ions and a lower alkanol solution, wherein the lower alkanol is selected from the class consisting of methanol, ethanol, propanol or isopropanol, of a partial amide of derivatives of ethylene diamine tetraacetic acid, said partial amide formed by the reaction of one mole of ethylene diamine tetraacetic acid with at least two moles of a lower alkyl amine of the formula

wherein $R^1$ represents methyl, ethyl, propyl, isopropyl or butyl and $R^2$ is hydrogen or any of the moieties described for $R^1$ in a lower alkanol solvent selected from the class consisting of methanol, ethanol, propanol or isopropanol at a temperature of about 50° C. to about 200° C. wherein said partial amide is present in a molar quantity which is equal to the moles of ferric ion present and wherein the lower alkanol solution of the partial amide of ethylene diamine tetraacetic acid contains from about 25% by weight to about 75% by weight lower alkanol solvent based on the total weight of solution.

2. The composition of claim 1 wherein the lower alkanol is methanol and the lower alkyl amine is methylamine.

References Cited

UNITED STATES PATENTS

| 3,712,869 | 1/1973 | Yves et al. | 260—652.5 R |
| 3,360,575 | 12/1967 | Brown | 260—652.5 R |
| 3,580,854 | 5/1971 | Lasco | 260—651 R |
| 2,423,343 | 7/1947 | Plueddeman et al. | 260—652 J |
| 3,420,749 | 1/1969 | Dehn | 260—652.5 R |

OTHER REFERENCES

Perrin, Organic Complexing Reagents C, Chemical Analysis, vol. XVIII, Interscience Publishers, New York (1964), pp. 99–103, 286–287.

HOWARD T. MARS, Primary Examiner

U.S. Cl. X.R.

203—6; 252—401, 403; 260—177 XA